(12) United States Patent
Nabeiro et al.

(10) Patent No.: US 12,465,169 B2
(45) Date of Patent: Nov. 11, 2025

(54) SYSTEMS AND PROCESSES OF DISTRIBUTION OF EDIBLE PRODUCTS TO A RECIPIENT REGULATED BY A CIRCULAR DISPOSITION

(71) Applicant: NOVADELTA—COMÉRCIO E INDÚSTRIA DE CAFÉS, LDA, Lisbon (PT)

(72) Inventors: Rui Miguel Nabeiro, Campo Maior (PT); João André De Figueiredo Branco, Moscavide (PT); Jesús Medina Mundt, Lisbon (PT); João André De Brito Leão, Vila Nova de Gaia (PT)

(73) Assignee: NOVADELTA—COMÉRCIO E INDÚSTRIA DE CAFÉS, LDA, Lisbon (PT)

( * ) Notice: Subject to any disclaimer, the term of this patent is extended or adjusted under 35 U.S.C. 154(b) by 359 days.

(21) Appl. No.: 18/016,790

(22) PCT Filed: Jul. 13, 2021

(86) PCT No.: PCT/PT2021/050021
§ 371 (c)(1),
(2) Date: Jan. 18, 2023

(87) PCT Pub. No.: WO2022/019791
PCT Pub. Date: Jan. 27, 2022

(65) Prior Publication Data
US 2023/0270281 A1    Aug. 31, 2023

(30) Foreign Application Priority Data
Jul. 21, 2020    (PT) .......................... 116592

(51) Int. Cl.
A47J 31/52    (2006.01)
A47J 31/46    (2006.01)

(52) U.S. Cl.
CPC ........... *A47J 31/525* (2018.08); *A47J 31/461* (2018.08)

(58) Field of Classification Search
CPC ......... A47J 31/525; A47J 31/461; A47J 31/46
See application file for complete search history.

(56) References Cited

U.S. PATENT DOCUMENTS

2011/0315711 A1    12/2011 Hecht et al.
2021/0315413 A1*   10/2021 Nabeiro ................. A47J 31/46

FOREIGN PATENT DOCUMENTS

CA    3 117 356 A1    4/2020
CN    108771473 A     11/2018
(Continued)

OTHER PUBLICATIONS

International Search Report for PCT/PT2021/050021 dated, Oct. 25, 2021 (PCT/ISA/210).
(Continued)

*Primary Examiner* — Vishal Pancholi
(74) *Attorney, Agent, or Firm* — Sughrue Mion, PLLC

(57) ABSTRACT

The present invention discloses systems and processes of distribution of edible products, such as for example beverages, in particular a system comprising a product recipient (1, 1') adapted so that can be operatively placed on a placement disposition (2) that is operatively associated with an apparatus (3) for distribution of edible products that presents control means (5) adapted for controlling the operation of distribution of edible products, whereby said apparatus (3) further presents an interface disposition (7) including an actuation interface (71) associated with said placement disposition (2), and adapted so that provides input
(Continued)

to said control means (5) according to the handling of said actuation interface (71), including by means of a contact gesture on a contact surface thereof in a curved or circular-like movement around a reference axis (X).

19 Claims, 13 Drawing Sheets

(56) References Cited

FOREIGN PATENT DOCUMENTS

| | | |
|---|---|---|
| EP | 3 430 951 A1 | 1/2019 |
| WO | 2010/037806 A1 | 4/2010 |
| WO | 2017/200409 A1 | 11/2017 |
| WO | 2019/166470 A1 | 9/2019 |
| WO | 2020/085928 A2 | 4/2020 |

OTHER PUBLICATIONS

Written Opinion of the International Searching Authority for PCT/PT2021/050021 dated, Oct. 25, 2021 (PCT/ISA/237).

\* cited by examiner

```
┌─────────────────────────────────────────────────────────────────────┐
│ Placing a drinking recipient (1) on a placement position (A) on the │
│ placement disposition (2), optionally generating a first input      │
└─────────────────────────────────────────────────────────────────────┘
┌─────────────────────────────────────────────────────────────────────┐
│ Optionally, rotating the drinking recipient (1) around itself to a  │
│ retention position (B), optionally generating a second input        │
└─────────────────────────────────────────────────────────────────────┘
┌─────────────────────────────────────────────────────────────────────┐
│ Rotating an actuation interface (71) from a first angular position  │
│ (I) to a second angular position (II), thereby generating a third   │
│ input                                                               │
└─────────────────────────────────────────────────────────────────────┘
┌─────────────────────────────────────────────────────────────────────┐
│ Discharging a first substance to the drinking recipient (1)         │
│ according to at least one of said inputs                            │
└─────────────────────────────────────────────────────────────────────┘
┌─────────────────────────────────────────────────────────────────────┐
│ Optionally, rotating the actuation interface (71) in the opposite   │
│ direction, from the second angular position (II) to a first angular │
│ position (I), optionally generating a fourth input                  │
└─────────────────────────────────────────────────────────────────────┘
┌─────────────────────────────────────────────────────────────────────┐
│ Removing the drinking recipient (1) from the placement disposition  │
│ (2), optionally generating a fifth input                            │
└─────────────────────────────────────────────────────────────────────┘
```

FIGURE 25

```
┌─────────────────────────────────────────────────────────────────────┐
│ Placing a drinking recipient (1) on a placement position (A) on the │
│ placement disposition (2), optionally generating a first input      │
└─────────────────────────────────────────────────────────────────────┘
┌─────────────────────────────────────────────────────────────────────┐
│ Optionally, rotating the drinking recipient (1) around itself to a  │
│ retention position (B), optionally generating a second input        │
└─────────────────────────────────────────────────────────────────────┘
┌─────────────────────────────────────────────────────────────────────┐
│ Touching the actuation interface (71) in a gesture from a first     │
│ angular position (I) to a second angular position (II), thereby     │
│ generating a third input                                            │
└─────────────────────────────────────────────────────────────────────┘
┌─────────────────────────────────────────────────────────────────────┐
│ Discharging a first substance to the drinking recipient (1)         │
│ according to at least one of said inputs, including to the third    │
│ input                                                               │
└─────────────────────────────────────────────────────────────────────┘
┌─────────────────────────────────────────────────────────────────────┐
│ Optionally, touching the actuation interface (71) in a gesture in   │
│ the reverse direction, from the second angular position (II) to a   │
│ first angular position (I), optionally generating a fourth input    │
└─────────────────────────────────────────────────────────────────────┘
┌─────────────────────────────────────────────────────────────────────┐
│ Removing the drinking recipient (1) from the placement disposition  │
│ (2), optionally generating a fifth input                            │
└─────────────────────────────────────────────────────────────────────┘
```

FIGURE 26

SYSTEMS AND PROCESSES OF DISTRIBUTION OF EDIBLE PRODUCTS TO A RECIPIENT REGULATED BY A CIRCULAR DISPOSITION

CROSS REFERENCE TO RELATED APPLICATIONS

This application is a National Stage of International Application No. PCT/PT2021/050021 filed Jul. 13, 2021, claiming priority based on Portuguese Patent Application No. 116592 filed Jul. 21, 2020.

FIELD OF THE INVENTION

The present invention refers to the field of the systems for distribution of edible products, for example systems for distribution of beverages, presenting discharge means of the edible product to a collection recipient.

BACKGROUND OF THE INVENTION

There are known systems for distribution of edible products, in particular of beverages, that provide a discharge of edible product along a direction contrary to the direction of the gravity force, and through a wall of a recipient adapted for collection of edible product.

In particular, in the case of aromatic beverages such as for example espresso type coffee, the discharge of beverage is a relevant process with potential impact in quality of beverage in the recipient. Among several aspects, it is important to ensure that the operation of beverage preparation can be controlled in ergonomic by user. This aspect assumes a special relevance considering the particular disposition of the discharge and the use of the recipient for collection of edible product that should be correctly placed in the discharge disposition.

The document WO 2010/037806 A1 discloses a machine for preparing edible products that comprises a toggle-switch member connected with a control unit and that can be operated by a user by moving it to one from a plurality of different positions to select one amongst a plurality of operating values.

The document WO 2019/166470 discloses a beverage preparation machine with an improved user interface.

The document EP 3430951 A1 discloses a device and a process for controlling the extraction pressure in a process for preparing expresso type coffee.

The document CN 108771473 A discloses a machine for preparing tea based upon internet of things technology and control method of said machine.

The document WO2017/200409 A1 discloses a system of the type of the present invention whereby the discharge of edible product is done to a recipient that is required to be operatively placed on a placed disposition. In particular, this document discloses a solution whereby the recipient placement disposition can be adapted so that can apprehend at least two recipient placement positions, thereby providing better operation safety and reliability.

The document WO 2020/085928 also discloses a system of the type of the present invention, whereby the apparatus presents interface means adapted so that can apprehend a rotation movement of the recipient operatively placed on the placed disposition, and provide a respective input to the control means of apparatus.

None of the documents in the prior art discloses a solution that provides an ergonomic utilization interface adapted for such discharge arrangement, including control of the discharge of edible product, associated in such ergonomic manner with the placement disposition and further technical characteristics disclosed by the present invention.

GENERAL DESCRIPTION OF THE INVENTION

The objective of the present invention is to provide a system adapted so that provides a simpler and more ergonomic interaction by a user with an apparatus for distribution of edible products, in particular an apparatus whereby the discharge of edible product is realized along a direction opposite to the direction of the gravity force, including regulation of the discharge of said edible product to a product recipient operatively placed on a placement disposition of the apparatus.

This objective is solved according to the present invention by means of a system for distribution of edible products according to claim 1, whereby preferred embodiments are described in the secondary claims.

In particular, the aforementioned objective is solved by means of a system whereby the apparatus presents an interface disposition associated with the placement disposition so that extends around at least part of the axis of discharge of edible product and is functionally connected with control means of operation of the apparatus, so that a user can generate control and regulation inputs at least of the product discharge, by means of contact gestures with the interface disposition made around said axis of product discharge.

The interface disposition can include an actuation interface and apprehension means adapted so that can apprehend at least one of position and movement of a circular interface associated with said recipient placement disposition, in particular rotation movement around a reference axis, and thereby provide a regulation at least of discharge of edible product to said recipient.

The apparatus presents a placement disposition that comprises an upwards-oriented product discharge, a placement surface configured for placing a recipient and, preferentially, retention means adapted for operative placement of a product recipient, including removable retention thereof on the placement surface, and that provides pressurized injection of the discharge flow of edible product, for example a beverage, to the interior of the recipient along a direction opposite to the direction of the gravity force, through a base region of the recipient, for example a drinking recipient.

It is preferred when said reference axis corresponds at least approximately to at least one of the operative direction of placement of the recipient on the placement disposition, to the central axis of the recipient and of the placement disposition, and to the direction of discharge of the edible product to the recipient.

The system can provide the preparation of at least one type of beverage, for example espresso coffee and similar beverages, the apparatus in this case including a flow pressurization device, for example of the type hydraulic pump, and a product preparation device, for example an extraction device, adapted so that can collect a single portion of edible substance, for example roasted and ground coffee, optionally provided inside of a respective capsule.

In the remaining description it is considered the case of a beverage preparation system, and therefore, of a drinking recipient, such as for example a glass, cup, or similar, without thereby constraining the scope of the present invention.

Another objective of the present invention is to provide a process of preparation of beverages including the use of a recipient and a placement disposition, whereby the beverage discharge flows through a base region of said recipient, so that the retention of the recipient is provided in ergonomic manner.

This objective is solved according to the present invention by means of a method of preparing beverages according to claim 15, whereby preferred embodiments are described in the secondary claims.

The process according to the invention can be solved by means of operating a system according to any of claims 1 to 14.

DESCRIPTION OF THE FIGURES

The invention shall be hereinafter explained in greater detail based upon preferred embodiments thereof and the attached Figures.

The Figures show, in simplified schematic representations:

FIG. 25: flux diagram of a first embodiment of a process according to the present invention;

FIG. 26: flux diagram of a second embodiment of a process according to the present invention.

DETAILED DESCRIPTION OF PREFERRED EMBODIMENTS OF THE INVENTION

The present invention shall be described based upon embodiments of a beverage preparation system, in particular based upon the extraction of an individual portion (9) of edible substance that is a beverage precursor, for example provided in a capsule.

Figure 1:
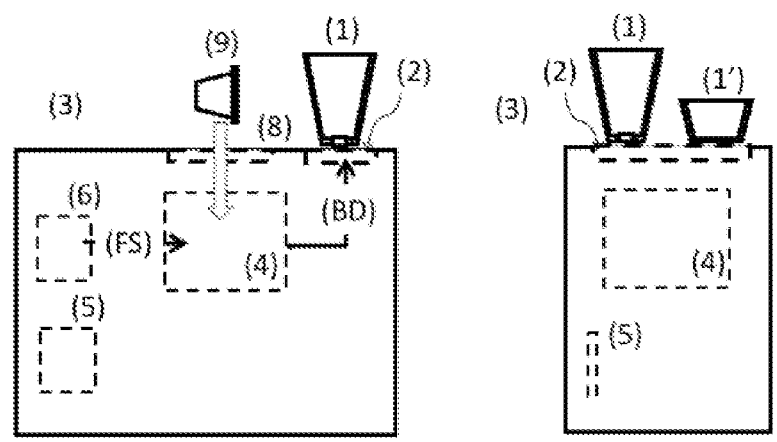
FIG. 1: side view, on the left-hand side, and frontal view, on the right-hand side, of main components of a system of the type of the present invention.
Figure 2:
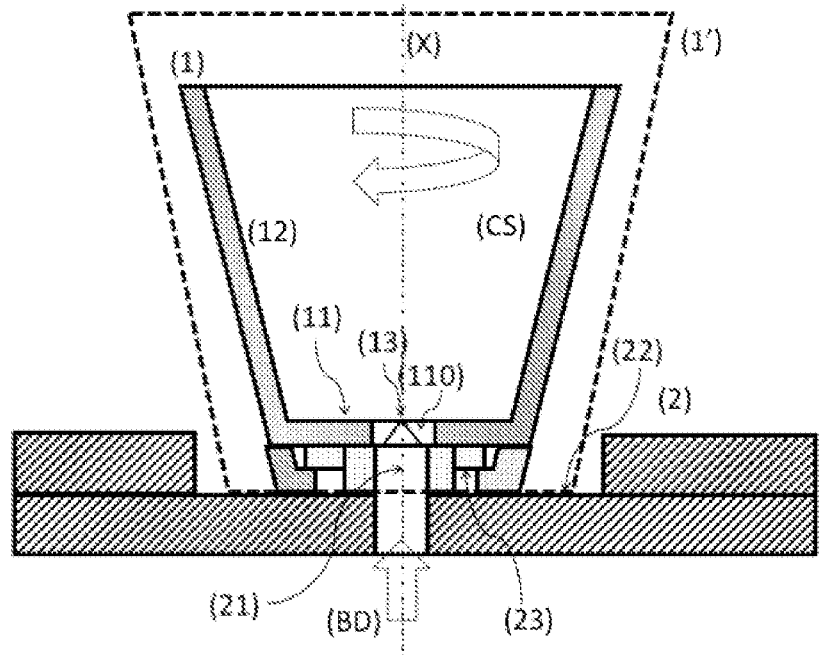
FIG. 2: side cut view of a drinking recipient (1) operatively placed in a placement disposition (2) associated in fluid connection with an apparatus (3), of a system of the type of the present invention.

FIG. 1 represents such a beverage preparation system based upon individual portions (9) of an edible substance, and FIG. 2 represents the operative placement of a recipient (1, 1'), in this case a drinking recipient such as for example a cup or glass, in a placement disposition (2) of an apparatus (3) according to FIG. 1.

In the represented case, said system comprises a beverage preparation system (3), for example in the form of a machine for preparing espresso coffee and similar aromatic beverages, that presents at least one product preparation device (4), that in the represented case is a coffee extraction device, that can be provided as an interior or exterior part of the casing of said apparatus (3) and that can be actuated between open and closed positions, and vice-versa, so that can collect an edible substance precursor of beverage. The edible substance, for example roast and ground coffee beans, can be provided inside of an individual portion (9), for example in the form of a pad, capsule, or other type of confinement thereof, adapted so that can be collected inside the product preparation device (4).

Moreover, the beverage apparatus (3) can include a fluid reservoir (not represented), as well as a flow pressurization device (6) and a fluid heating device (not represented), so that supply a flow (FS) at a temperature comprised between 60 and 100° C. and under a pressure comprised between 1 and 20 bar, preferentially more than 10 bar, so as to interact with said edible substance.

The system comprises at least one type of recipient (1, 1') that presents a base wall (11) comprising a passage opening (110) and a sidewall (12) configuring a drinking opening. The drinking recipient (1) is adapted so that can be operatively retained in the placement support (22) of the placement disposition (2), that is, in stable and reliable manner relative to the force exerted by the injection of pressurized flow of beverage discharge (BD) through the base region of the drinking recipient (1).

The drinking recipients (1, 1') can present a flow regulation disposition (13), for example of single-way valve type (symbolically represented by a triangle), retained in a passage opening (110) of the base wall (11) and adapted so that only (BD), downstream to the collection space (CS), along a direction opposite to the one of the gravity force, if impinged with a flow pressure bigger than a previously defined value of flow pressure.

Said pressurized beverage discharge flow (BD) is then conducted from an outlet of said product preparation device (4) to a placement disposition (2) arranged flow-downstream thereof.

The placement disposition (2) includes a product discharge element (21), for example of the type injection nozzle, advantageously provided in a central region, and a recipient placement support (22) advantageously provided so as to contribute to the retention of the recipient (1) with the passage opening (110) in the base region thereof aligned with the product discharge element (21).

The placement disposition (2) advantageously further includes retention means (23) associated with the placement support (22), adapted so that can engage in respective retention elements (14) associated with the base region of the recipient (1, 1') and thereby can retain a drinking recipient (1, 1') in operative position in the placement support (22).

The apparatus (3) further comprises control means (5) adapted so that can control the operation of the apparatus (3), in particular the start and finish of the process of preparation and discharge of beverage to a drinking recipient (1), as well as several other operation parameters of each beverage preparation cycle and display of respective information.

Figure 3:
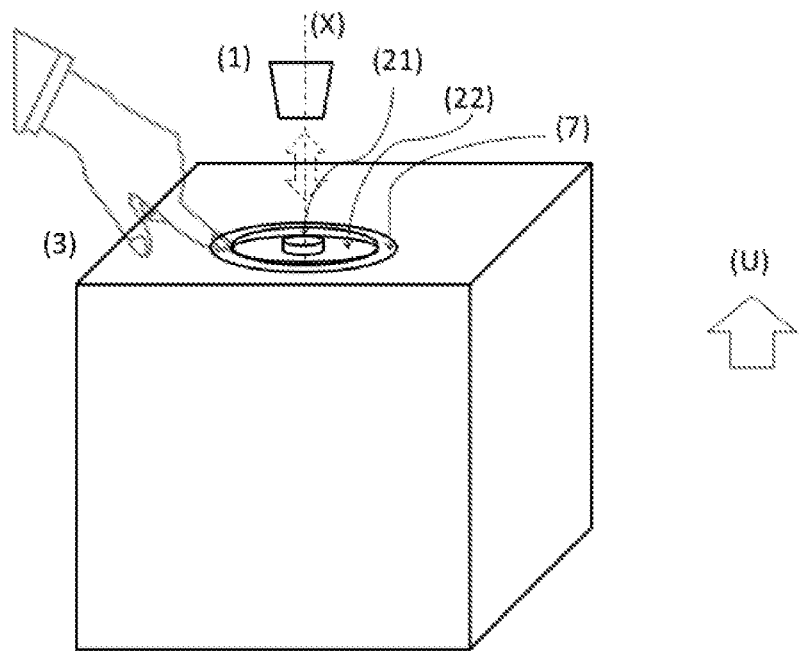
FIG. 3: perspective view of a drinking recipient (1) operatively placed on a placement disposition (2) in an apparatus (3) and system according to the present invention.
Figure 4:
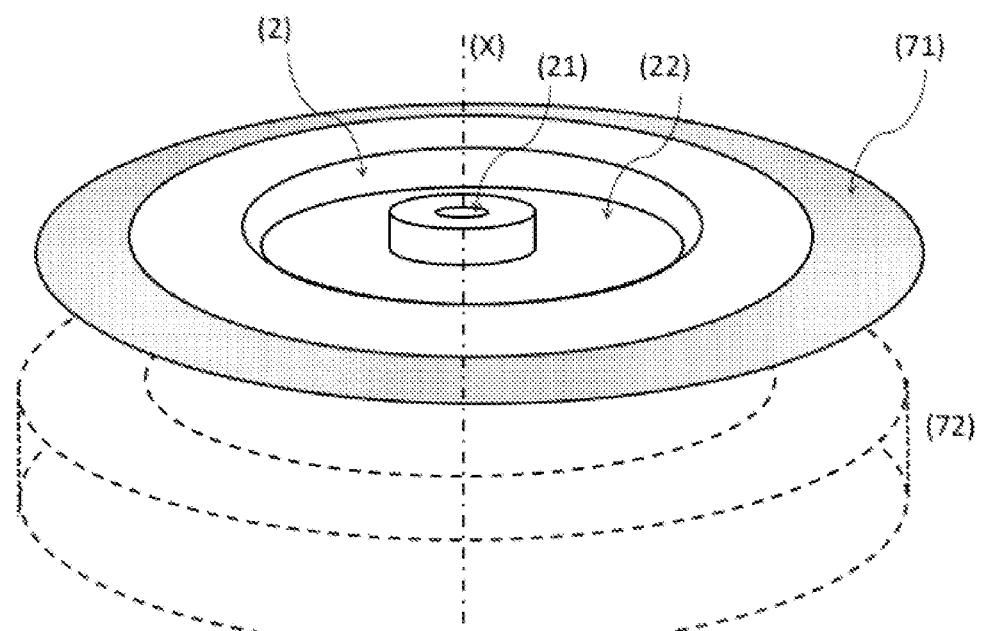
FIG. 4: perspective view of a first type of embodiments of interface disposition (7) in an apparatus (3) and system according to the present invention.

FIGS. 3 and 4 schematically represent the general principle and characteristics of a system according to the present invention.

As represented, the beverage apparatus (3) is adapted so that a user can place a drinking recipient (1) in an operative position on a placement disposition (2), in particular aligned herewith along a reference axis (X). In the case represented, said placement disposition (2) is advantageously disposed in a frontal region of the apparatus (3), with relation to a preferential utilization direction (U) thereof by a user.

Said reference axis (X) can be a central symmetry axis of the drinking recipient (1) and of the placement disposition (2).

According to an inventive aspect, said apparatus (3) comprises an interface disposition (7) provided around the recipient placement disposition (2), or at least the recipient support (22), preferentially in centre manner relative to the reference axis (X), and adapted so that can apprehend inputs generated by a user by means of direct touch gesture with the contact surface of an actuation interface (71).

In particular, the interaction of the user with the interface disposition (7) and, hence, with the control means (5) of the apparatus (3), is provided by means of touch movements upon the contact surface of the actuation interface (71), whereby said movements can include movement around the reference axis (X).

Moreover, according to another inventive aspect, the apparatus (3) further comprises apprehension means (72) functionally associated to the actuation interface (71) and adapted so that can apprehend at least one aspect of the touch movement by the user upon a contact surface of the actuation interface (71).

In particular, said apprehension means (72) are disposed underneath the actuation interface (71) and extend so that occupy only a peripheral volume relative to the product discharge element (21).

The actuation gesture can be of spot touch or of exerting a force upon the contact surface, including along an actuation alignment of the actuation interface (71), that is, in a direction of curved or circular shape around the reference axis (X).

The interface disposition (7) can be associated with the placement disposition (2) and functionally connected to control means (5) of the apparatus (3), whereby the interface disposition (7) is adapted so that can apprehend at least one, preferentially several aspects at least of a rotation movement of the actuation interface (71) around the central reference axis (X) with the drinking recipient operatively placed on the placed disposition (2).

In particular, in the case of represented embodiment, the interface disposition (7) is adapted so that can apprehend the direction of rotation and the angular extension of the rotation movement of the actuation interface (71) starting from a reference position thereof.

In the case of a first embodiment represented in FIGS. 5 to 10, the interface disposition (7) comprises an actuation interface (71) with a disc shape that can be actuated along at least part of the circular extension around the que recipient support (22), whereby said actuation interface (71) is provided in functional connection with apprehension means (72) adapted so that can apprehend aspects of a movement thereof.

Figure 5:
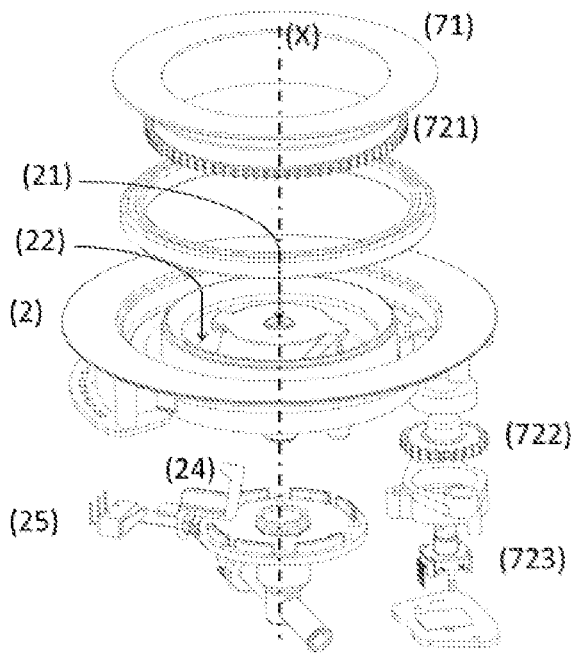
FIG. 5: exploded perspective view of a first embodiment of the type of FIG. 4.

In particular, as can be better observed in FIG. 5, the actuation interface (71) can be provided in the form of a disc centred relative to the central reference axis, and adapted so that can be moved around the latter.

The actuation interface (71) is thus provided so that the user can generate a rotation movement thereof along an extension of actuation around said reference axis (X), whereby at least one of direction of rotation, and relative dimension of the extension of rotation, relative to an initial reference position, can be apprehended by respective apprehension means (72), thereby generating a corresponding input.

In this case, the input can be generated by means of an actuation gesture exerted by the user upon the contact surface of the actuation interface (71), that is, an exterior surface thereof.

Figure 7:
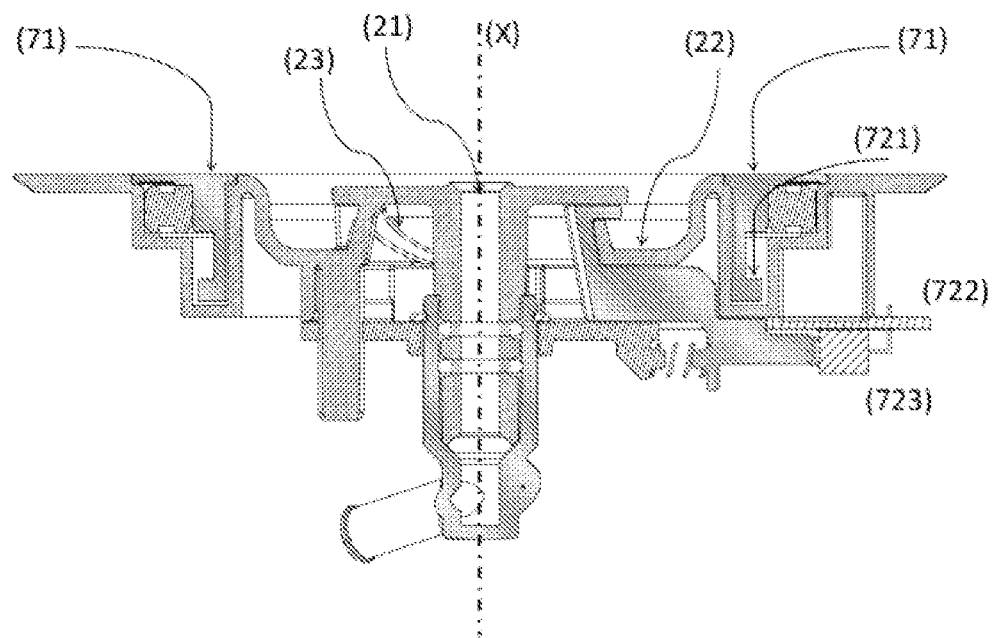
FIG. 7: cut view along the cut plane L of FIG. 6.
Figure 8:
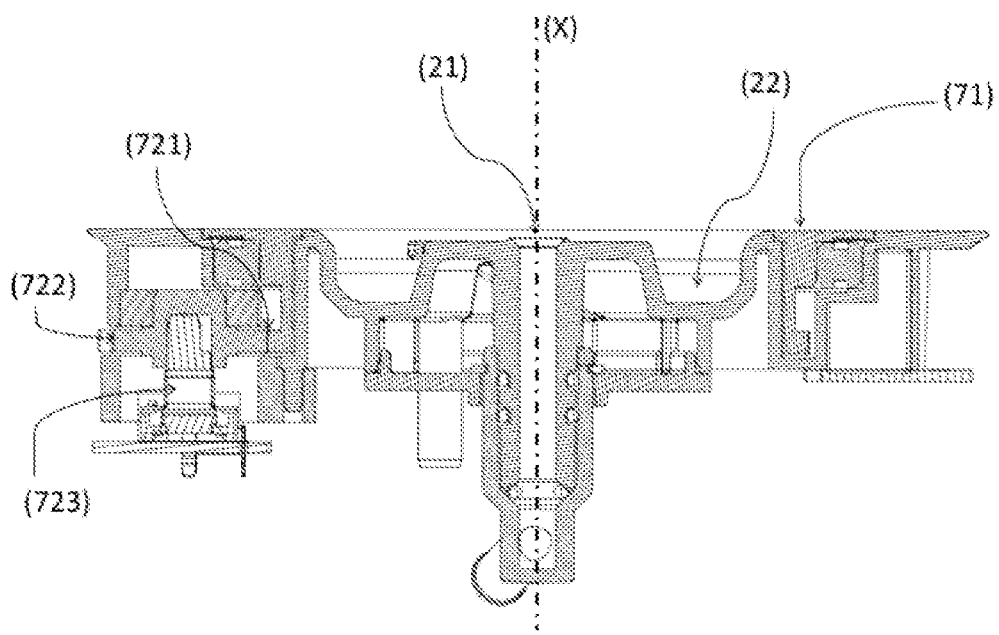
FIG. 8: cut view along the cut plane M of FIG. 6.

As can be observed in FIGS. 7 and 8, the actuation interface (71) can be provided in operative connection with a motion transmission device, such as for example in the form of bearings, so that can be rotated by a touch gesture of a user, along a given extension around the central reference axis (X).

The apprehension means (72) are in this case provided in the form of mechanical engagement means (721, 722) configured so that can transmit the rotation movement, conveyed by the user to the actuation interface (71), to an electromagnetic device (723) that converts the movement into an electric signal.

Figure 6:
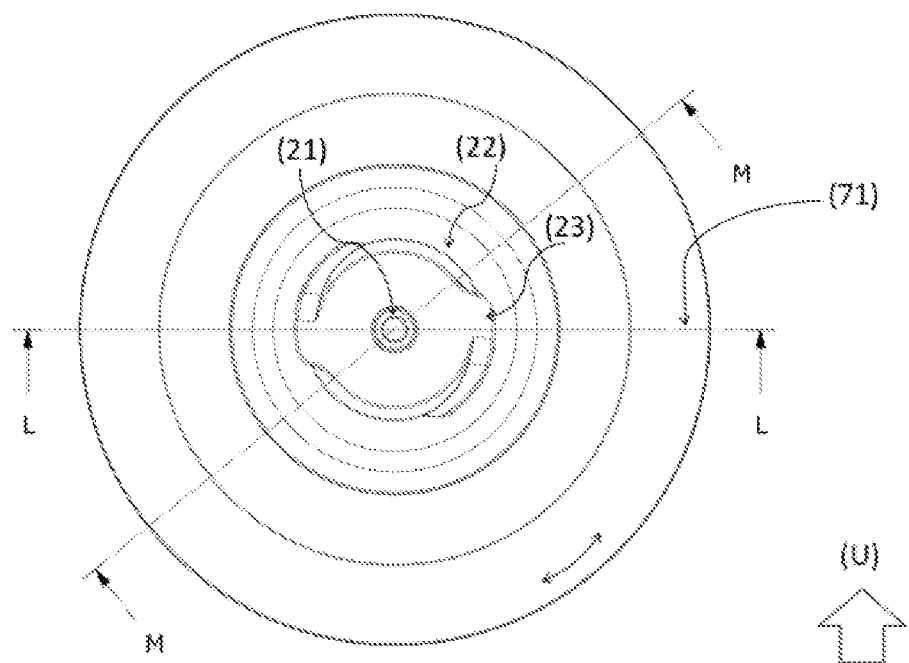
FIG. 6: top view of the embodiment of placement disposition (2) and interface disposition (7) according to FIG. 5.

As can be further observed in FIG. 6, the interface disposition (7) is advantageously configured so that extends around the placement disposition (2), and, therefore, of the respective product discharge element (21).

Figure 9:
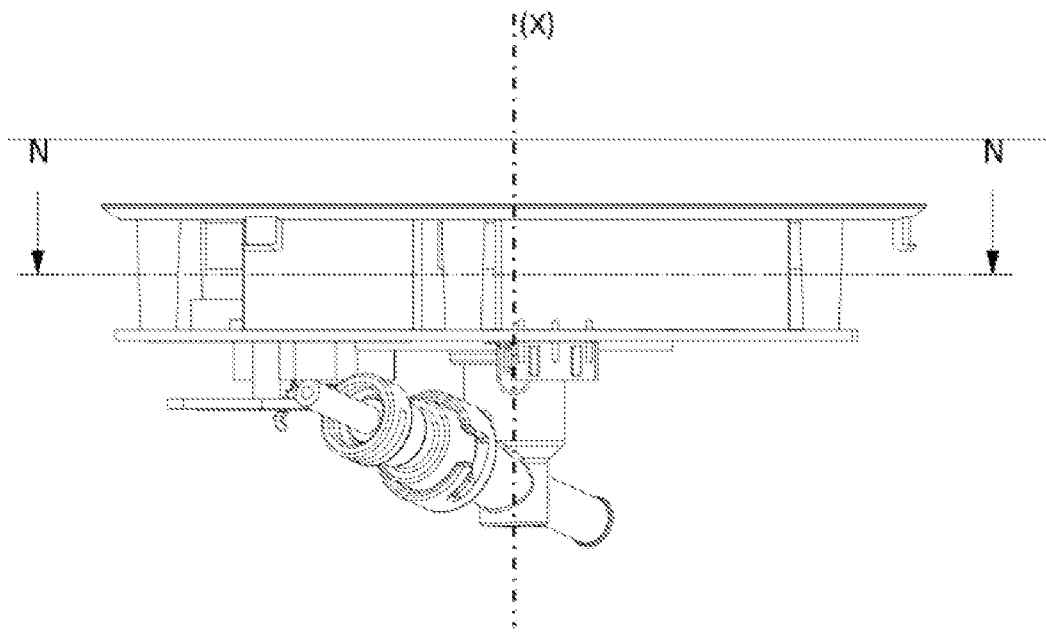
FIG. 9: side view of the embodiment according to FIG. 6.

As can be further observed in FIG. 9, the interface disposition (7) is configured so that occupies a relatively reduced volume, preferentially a volume whose height does not exceed double of, preferentially is similar to the construction height of the placement disposition (2).

Figure 10:
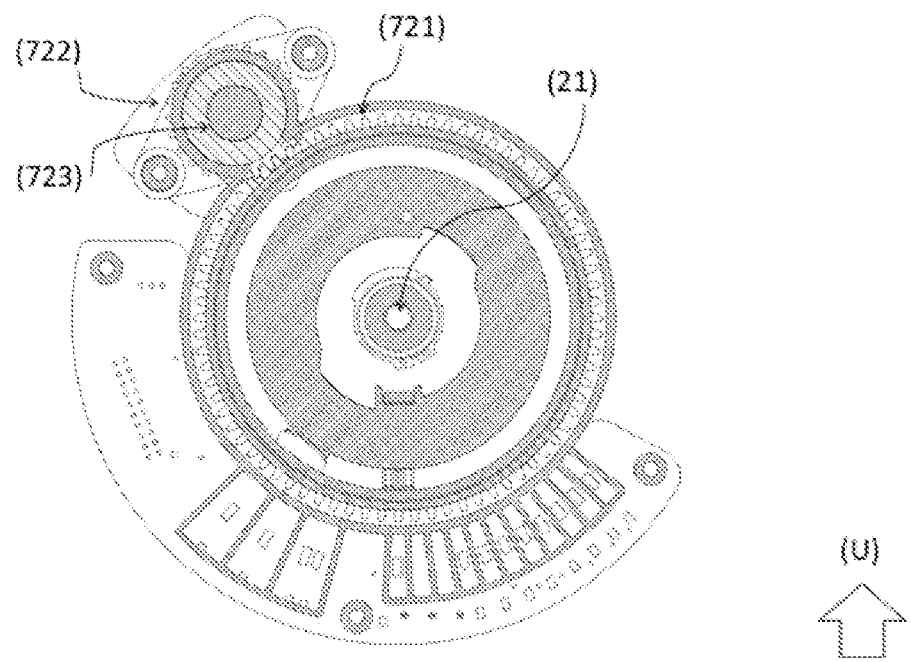
FIG. 10: top view of apprehension means (721, 722, 723) of the interface disposition (7) according to cut plane N of FIG. 9.

In the case of this embodiment, as can be observed in FIG. 10, the actuation interface (71) is provided in connection, preferentially in a single piece, with a first engagement element (721) at a level below the recipient placement surface of the placement disposition (2) and that presents engagement teeth along an exterior perimeter, whereby these engagement teeth engage with the engagement teeth of a second engagement element (722), in this case a gear wheel, mounted in an axis common with the axis of an electric potentiometer (723) that can apprehend the direction and extension of rotation movement, and communicate this input to the control means (5).

According to a preferred embodiment, the placement disposition (2) can present recipient retention means (23), for example in the form of a mechanical engagement with a corresponding part in the base region of the drinking recipient (1). It is advantageous when the correct retention of the drinking recipient (1) can apprehended by retention apprehension means (24, 25), preferentially disposed at a level below the level of the actuation interface (71).

It is advantageous when the apprehension means (72) are configured so that only can provide input to the control means (5) in case there is detected a correct placement of the drinking recipient (1) in the placement disposition (2) by the retention apprehension means (24, 25).

In the case of a second embodiment represented in FIGS. 11 to 15, the interface disposition (7) comprises an actuation interface (71) also configured in form of a disc that can be actuated along at least part of the extension around the recipient support surface (22), whereby said actuation interface (71) is likewise provided in functional connection with apprehension means (72) adapted so that can apprehend aspects of a movement thereof.

But, in the case of this embodiment, the apprehension means (72) operate according to a different principle of apprehension of movement.

Figure 11:
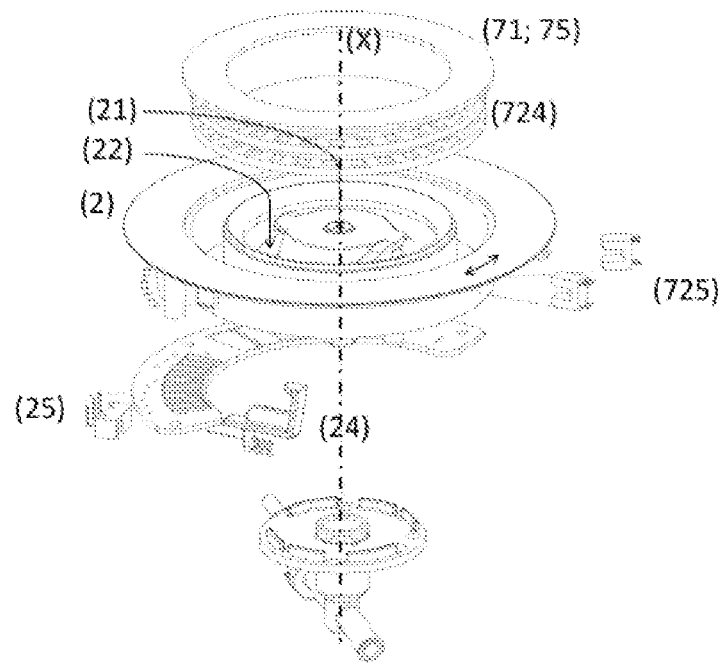
FIG. 11: exploded perspective view of a second embodiment of the placement disposition (2) and interface disposition (7) according to the present invention.
Figure 12:
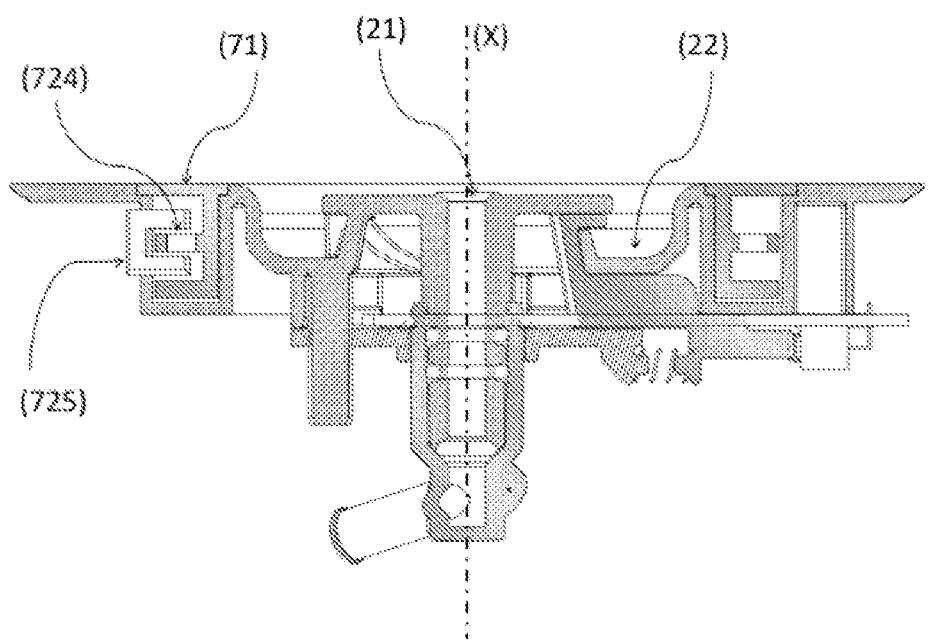
FIG. 12: side cut view of the embodiment according to FIG. 11.
Figure 13:
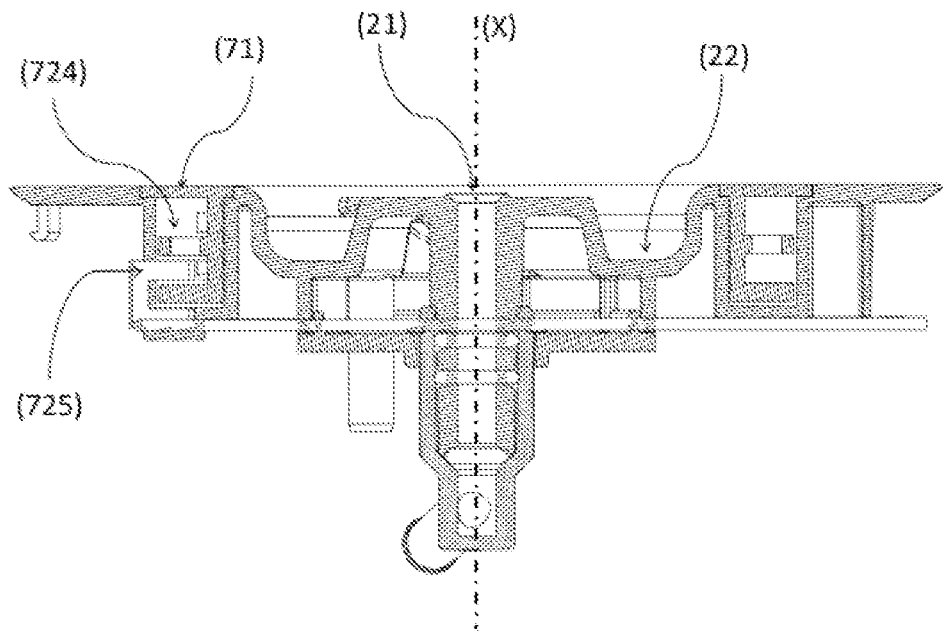
FIG. 13: side cut view of the embodiment according to FIG. 11.
Figure 14:
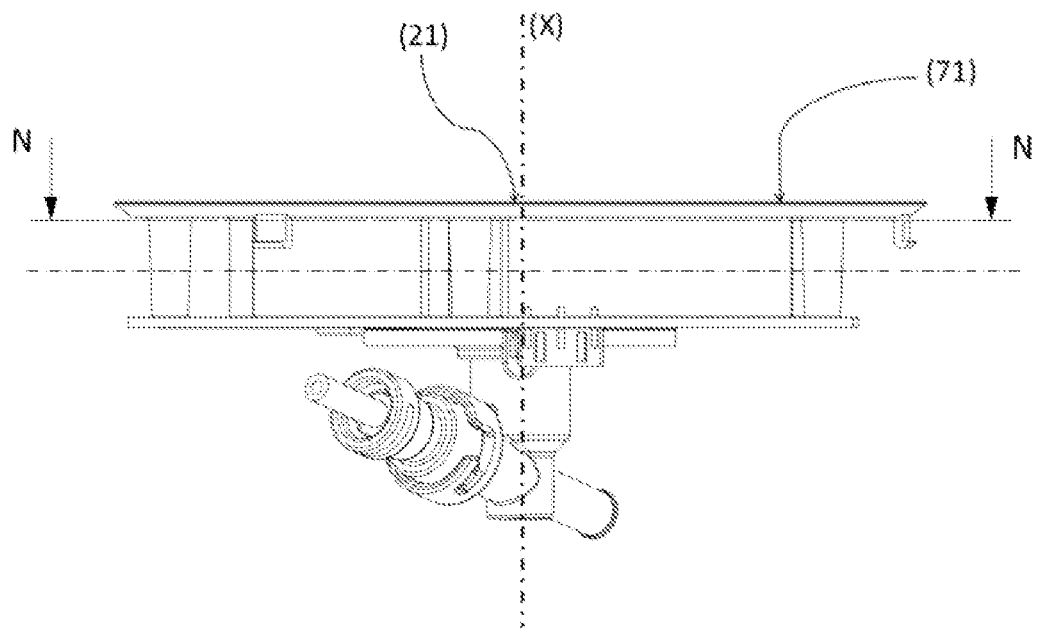
FIG. 14: side cut view of the embodiment according to FIG. 11.
Figure 15:
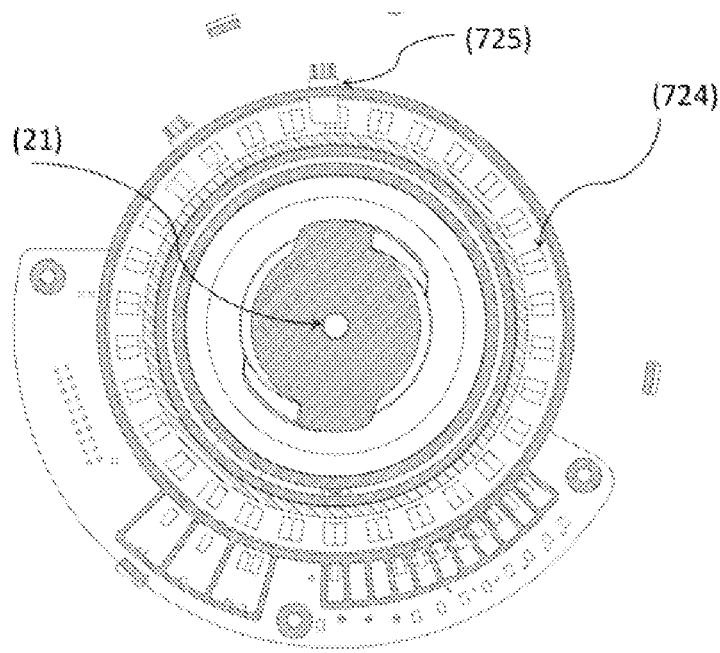
FIG. 15: top view of apprehension means (724, 725) of the interface disposition (7) according to cut plane N of FIG. 11.
Figure 16:
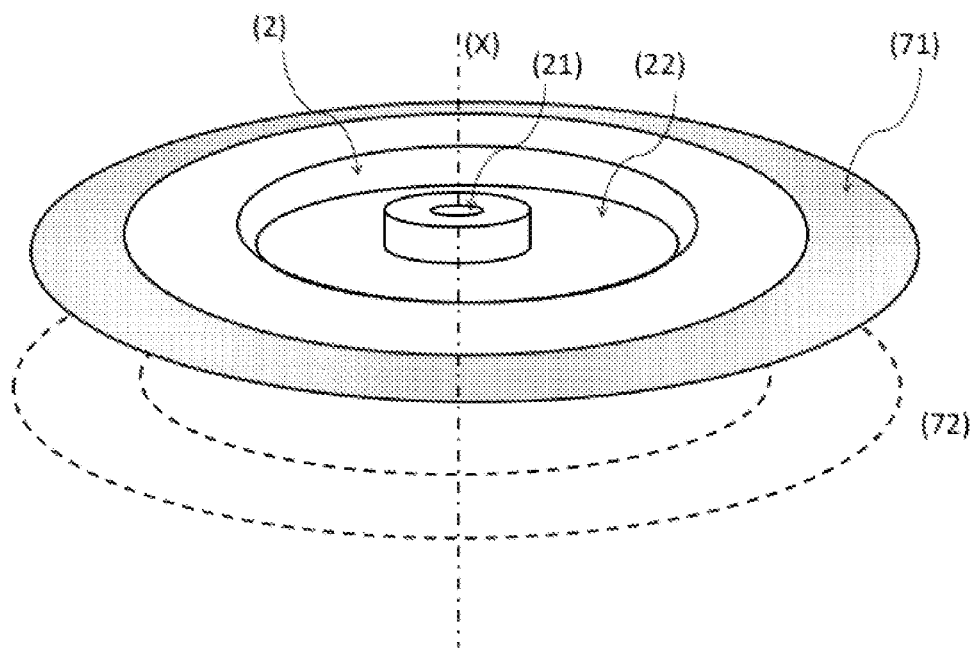
FIG. 16: perspective view of a second type of embodiments of interaction disposition (7) in an apparatus (3) and system according do the present invention.
Figure 17:
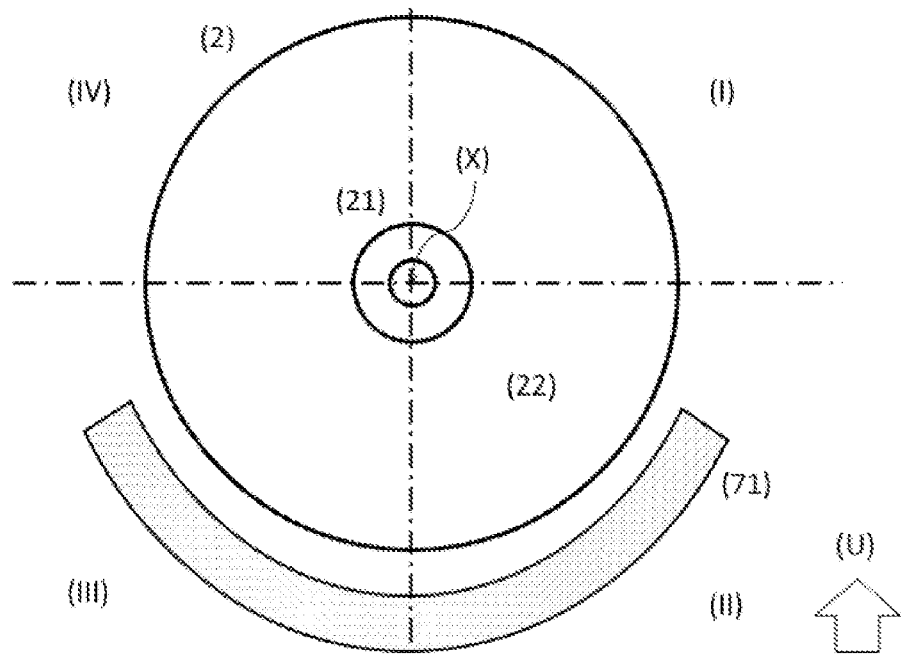
FIG. 17: top view of a first embodiment of the type of FIG. 16.
Figure 18:
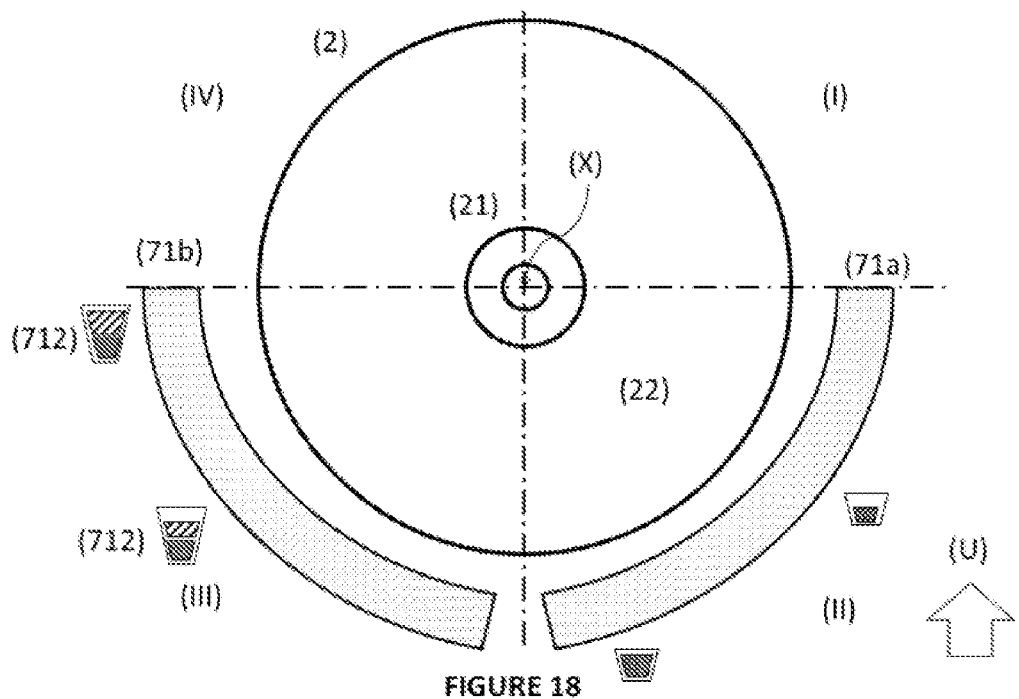
FIG. 18: top view of a second embodiment of the type of FIG. 16.
Figure 19:
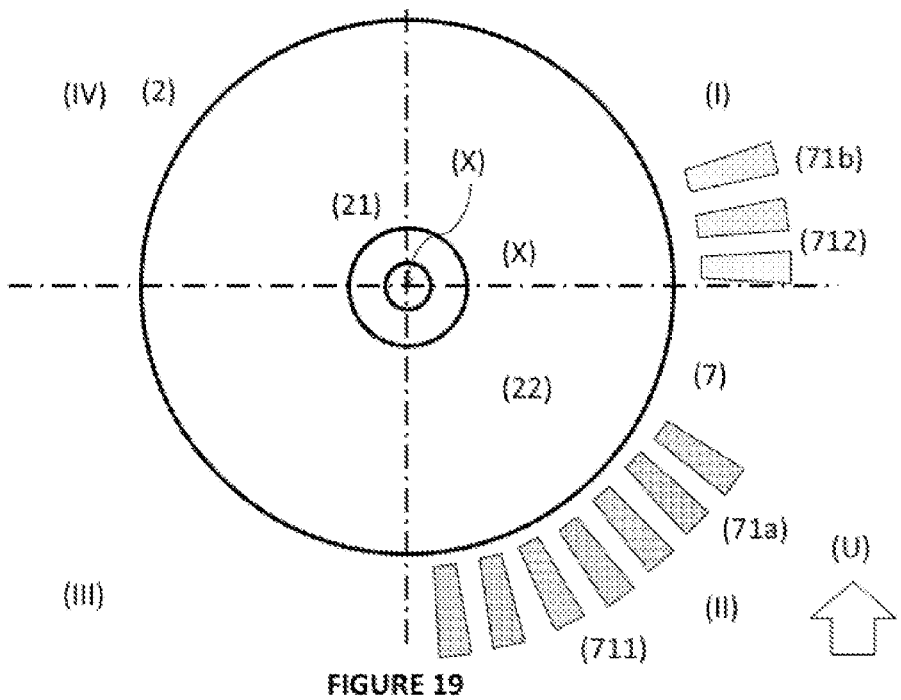
FIG. 19: top view of a third embodiment of the type of FIG. 16.
Figure 20:
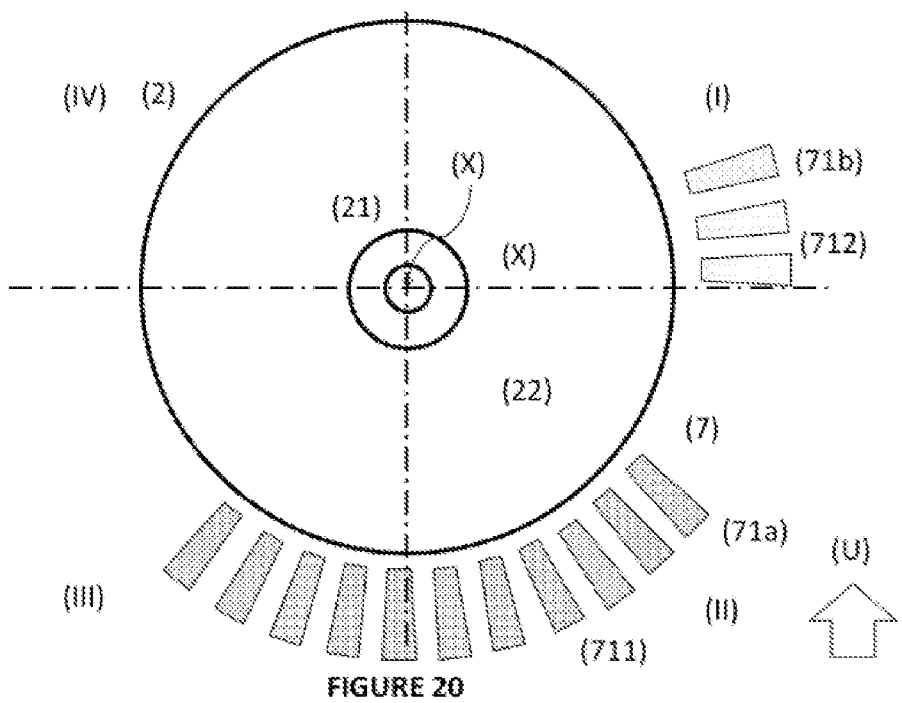
FIG. 20: top view of a fourth embodiment of the type of FIG. 16.

In fact, as can be observed in FIG. 11, the apprehension means (72) are provided so that can operate based upon an optical disposition, for example of the encoder type, or similar, adapted so that can apprehend at least one aspect of the rotation movement of the actuation interface (71) around the central reference axis (X).

In particular, the apprehension means (72) comprise an interaction disposition (724) that comprises a plurality of openings disposed successively along a perimeter associated with the actuation interface (71), disposed so that can intersect at least one beam of electromagnetic, for example an infrared beam, provided by a respective lighting source (725).

The number of interruptions of said radiation beam can be associated with an extension of angular displacement of the actuation (71) as a result of a rotation movement thereof by the user.

According to an alternative embodiment, besides of said apprehension means (72) adapted so that can apprehend a rotation movement, the interface disposition (7) can further comprise second apprehension means (72) functionally associated with the product discharge (21) and adapted so that can apprehend a touch of pressure exerted by the user upon the interface disposition (7), in particular upon at least one actuation portion (711) of the contact surface of the actuation interface (71), in a rotation movement around and generally transversal relative to the direction of the reference axis (X).

FIGS. 16 to 24 represent a third embodiment whereby the actuation interface (71) is provided stationary and extending along at least part of the surrounding of the recipient placement disposition (2).

Moreover, the actuation interface (71) can present a contact surface adapted so that can apprehend a direct touch by the user, such as for example a capacitive surface, or similar.

The user can thus touch on the contact surface and slide her finger along a relative extension of the contact surface, or of a number of parts thereof, so that said relative extension can be apprehended by electronic means.

In particular, the interface disposition (7) can comprise an actuation interface (71) including actuation portions (711) that can simultaneously also be apprehension means (72) or actuation portions (711) and apprehension means (72) that can be contacted by the actuation portions (711), as well as lighting means (73) functionally associated with at least one of: respective actuation portions (711) and respective apprehension means (72), said lighting means (73) being preferentially disposed underneath the apprehension means (72) and provided in an opaque or non-opaque material, rigid or flexible, and said lighting means (73) being provided as devices of LED type, or similar.

The interface disposition (7) can comprise an actuation interface (71) that presents a single contact surface, with a single and continuous extension, whereby said contact surface extends along an actuation alignment in all four quadrants (I, . . . IV) around the placement support (22).

Alternatively, the interface disposition (7) can comprise an actuation interface (71) that presents a plurality of contact surfaces provides as a plurality of contact elements (711, 712) disposed successively in relative proximity to each other along an actuation alignment in a form of circular type, whereby said contact elements (711, 712) can be grouped in one or more actuation regions (71a, 71b), distributed at least in the second quadrant (II), preferentially also in the third quadrant (III), around the placement support (22).

It is advantageous when said contact surface can be associated with lighting means (73) adapted so that can indicate a respective actuation state to the user, corresponding to the relative extension of actuation of the contact surface.

Figure 21:
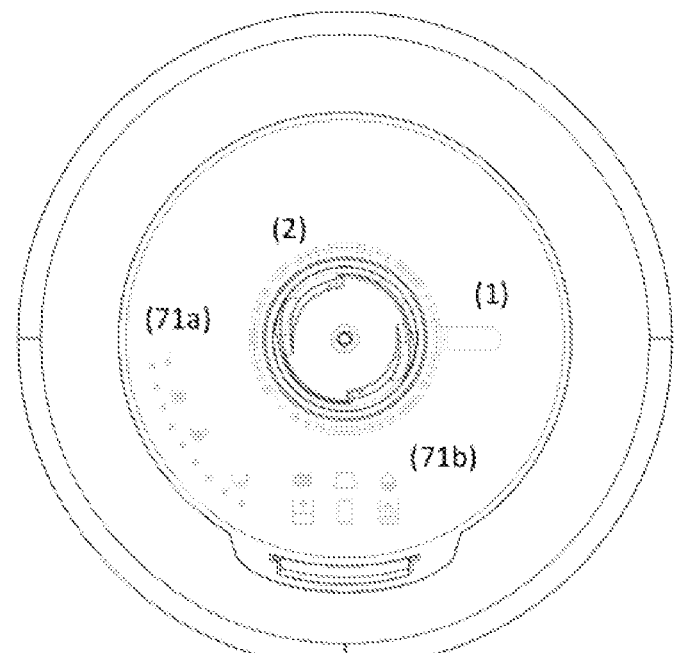
FIG. 21: exploded perspective view of construction detail of an embodiment according to the present invention.
Figure 22:
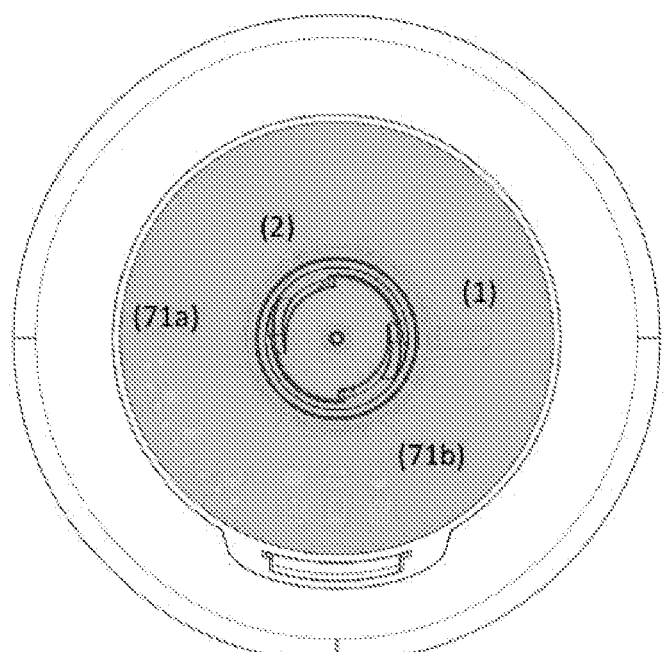
FIG. 22: top view of construction detail of an embodiment according to the present invention.

FIGS. 21 and 22 represent top views of an apparatus (3) according to the invention that presents a placement disposition (2) in its top region, for operative retention of a drinking recipient (1). According to this embodiment, the top region of the apparatus (3) associated with the placement disposition (2), for example a portion or a piece of the envelope of the apparatus (3), can be provided in a sufficiently flexible material so that a pressure touch exerted by the user upon a portion thereof, can generate a contact with apprehension means (72) arranged underneath thereof.

Said apprehension means (72) can be devices of the capacitive surface type, or similar.

Said top portion of the apparatus (3) can present a plurality of actuation portions (711) disposed next to each other, and that preferentially present light transmission properties, so that can transmit light from the lighting means (73) disposed underneath.

Figure 23:
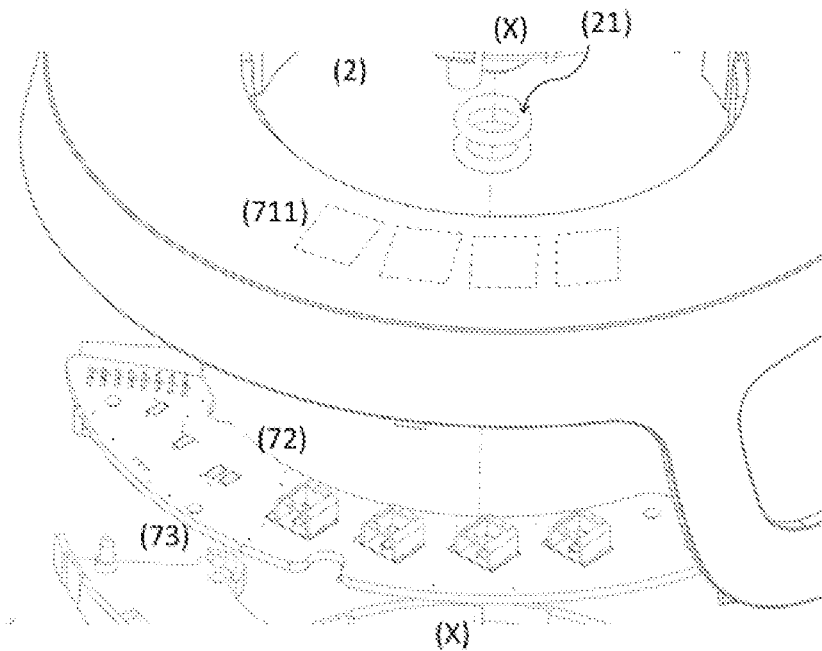
FIG. 23: top view of an embodiment of apparatus (3) with an interface disposition (7) according to FIG. 16.
Figure 24:
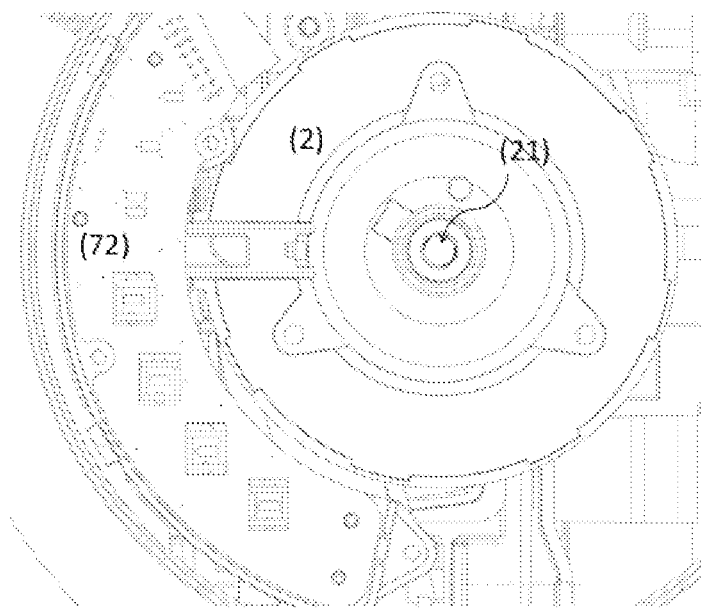
FIG. 24: top view of the embodiment according to FIG. 23.

FIGS. 23 and 24 represent a constructive solution of the apprehension means (72) and lighting means (73) associated with the embodiment of FIGS. 21 and 22.

As represented, the apprehension means (72) can be configured as individual pieces in a general shape of arch type and with an opening in the top region over the lighting means (73), so that present a surface of apprehension by contact with the actuation portions (711), but also provide visibility of respective lighting means (73) on the exterior of the apparatus (3).

FIGS. 25 and 26 represent embodiments of operation process of a system according to the present invention.

The process according to the present invention includes at least one interaction by the user by means of direct touch on the contact surface of an interface disposition (7) that extends at least in part around the placement disposition (2).

Moreover, the process can comprise the following steps:

placing a drinking recipient (1) on a placement disposition (2), in particular retained in an operative position thereon such that can collect a beverage discharge;

touching on the actuation surface of the actuation interface (71);

providing at least a first operation input to the control means (5) based upon the type of gesture made on the contact surface of the actuation interface (71), initiating flow circulation, for example in a beverage preparation cycle;

discharging a first edible product, for example discharge of a beverage resulting from the extraction of portion (9) of edible substance, by the product discharge element (21) on the placement disposition (2) to the drinking recipient (1) through the base thereof, optionally, making a second gesture of direct touch on the actuation interface (71) during said discharge of edible product, and thereby provide a second operation input, including for example increasing and/or reducing the extension of displacement that resulted from the first movement relative to the first operating position, whereby the second operation input corresponds to the difference in the operation value, for example volume of the discharge, to the operation value associated with said first operating input;

terminating the discharge of edible product after at least one of:
the operation value, associated with the last of said first and following operating inputs provided to the control means (5), is reached;
the drinking recipient (1) is moved to the first retention position still during the discharge of edible product;
a direct touch by the user on the contact surface of the actuation interface (71);

moving the drinking recipient (1) in a direction opposite to said first direction, thereby releasing the drinking recipient (1) from retention on the placement disposition (2);

removing the drinking recipient (1) from the placement disposition (2).

Moreover, the process can further include the following steps:

moving the drinking recipient (1) in a first movement, optionally further in a second movement while on operative retention on the placement disposition (2), and initiating and concluding the discharge of a first, optionally of a second edible product, to the drinking recipient (1), removing the drinking recipient (1).

As referred above, said manual interaction can include the selection of at least one of:
type of operation of the apparatus (3);
operation parameter of the preparation of edible substance;
type of edible product;
quantity of edible product to be discharged;
other discharge parameters of the edible product to be discharged, such as for example discharge temperature and discharge pressure;
whereby to each one of the available selections corresponds at least one of: type of movement, extension of movement of direct touch carried out on the actuation interface (71), or movement thereof relative to a previously defined initial or reference position.

Moreover, said interaction of selection can further include at least one of the following steps of:
passing the apparatus (3) from a "standby" condition to an operation readiness condition;
actuation of opening and closing of an introduction passageway (8) of portions of edible substance;
introduction of a portion (9) of edible substance through the introduction passageway (8) of portion;
actuation of opening and closure of the extraction device (4);
whereby at least one of said steps is preferentially automatically initiated after the placement of a drinking recipient (1) in operative retention on said placement disposition (2).

The input generated by said manual interaction can be determined based upon at least one of:
type of movement,
direction of movement,
extension of movement,
of at least one of:
of the touch itself made by the user on the actuation interface (71), including in the case of apprehension means of haptic type or of contact surface,
of the movement made by the actuation interface (71) as a result of the touch by the user, including in the case of apprehension means of rotation movement.

The input generated by the manual interaction can be determined by the apprehension means (72, 73) based upon the apprehension of variation of a final position relative to an initial position or to a previously defined reference, of at least one of: touch on the actuation interface (71) and movement of the actuation interface (71).

Said manual interaction can be apprehended by apprehension means (72) that are functionally associated with the actuation interface (71), and communicated so that the control means (5) can determine at least one of:
type of operation of the apparatus (3), such as for example preparation of edible product or fluid circulation for cleaning the circuit of product preparation,
type of edible product to be discharged, such as for example coffee, or water, or milk, or other,
and/or
a quantity associated with the respective flow discharge of edible product to a recipient (1), for example drinking recipient, including at least one of:
relative quantity with relation to at least one reference of minimum and/or maximum;
duration of the product discharge, and
quantity of product discharge, measured for example as volume.

Lisbon, Jul. 13, 2021

The invention claimed is:

1. A system for distribution of edible products including:
a recipient for collecting an edible product; and
an apparatus configured to distribute the edible product in operation cycles including a supply of an individual portion of an edible substance, the apparatus comprising a placement disposition,
said recipient is configured to be operatively placed along a reference axis (X) on the placement disposition to collect the edible product, wherein
said placement disposition including a product discharge component configured to discharge the edible product in a direction opposite to the direction of the gravity force, and a placement support configured to operatively retain the recipient,
said apparatus comprising control means configured to control an operation of the apparatus, including operation parameters, data communication and information display associated with operation cycles thereof, and said apparatus comprises an interface disposition providing a contact surface with a curved configuration relative to the reference axis (X) configured to receive direct contact of a user to provide a respective input for regulation of at least one parameter associated with the operation cycles of the apparatus.

2. The system according to claim 1, wherein the interface disposition comprises an actuation interface and apprehension means configured for the user to manually interact with the apparatus by means of the direct contact on at least one location or along at least part of an extension of a contact surface of the actuation interface, and at least one of the actuation interface and the apprehension means are configured with at least one of: a general disposition and a general shape of ring type, or of a ring segment, disposed at least on a region on a front side of the apparatus or all around the reference axis (X).

3. The system according to claim 1, wherein the interface disposition comprises an actuation interface with the contact surface configured to receive direct contact by the user and disposed in a proximity of the placement disposition and around part or a totality of a perimeter of the placement support, and the interface disposition comprises apprehension means configured to be functionally associated with the control means, and receive at least one of: a relative position, a direction and a relative extension of the direct contact, including with relation to a first edge of the actuation interface-, or to a first angular position of the direct contact, or to a previously defined reference angular position on the contact surface of the actuation interface.

4. The system according to claim 1, wherein the interface disposition comprises an actuation interface with a ring shape configured to be rotated along an actuation alignment around the reference axis (X), by the direct contact with at least one finger on a location of the contact surface of the actuation interface and dragging of the actuation interface, whereby said actuation interface is provided functionally associated with an engagement disposition or with a sufficient inertia such that movement requires actuation by means of the direct contact thereupon.

5. The system according to claim 1, wherein the interface disposition comprises an actuation interface that is stationary with a general disposition of ring type or of arch of circumference, centered with relation to the reference axis (X), and configured to be actuated by the direct contact, and of type superficial contact along an actuation extension around the reference axis (X) that corresponds to at least part of the extension of actuation interface and without exerting pressure thereupon, whereby said actuation interface presents an exterior contact surface configured to operate in haptic manner and is provided as a device of capacitive surface type.

6. The system according to claim 1, wherein the interface disposition comprises an actuation interface that presents a single contact surface, with a continuous extension of the contact surface, whereby said contact surface extends along an actuation alignment in all four quadrants (I, . . . IV) around the placement support, or the interface disposition comprises an actuation interface that presents a plurality of contact surfaces providing a plurality of contact portions disposed successively in relative proximity from each other along an actuation alignment of shape of curved or circular type, whereby said contact portions can be grouped in one or more actuation regions of the actuation interface, distributed at least along a second quadrant (II) around the placement support.

7. The system according to claim 1, wherein the interface disposition comprises an actuation interface provided in connection with apprehension means collected in a reference volume inside a casing of the apparatus.

8. The system according to claim 1, wherein the interface disposition comprises an actuation interface including actuation portions that can also be apprehension means, or actuation portions and apprehension means that can be contacted by the actuation portions, as well as lightning means functionally associated with at least one of: respective actuation portions and respective apprehension means, said lightning means being disposed underneath the apprehension means and provided in an opaque or non-opaque material, rigid or flexible, and said lightning means being provided as devices of LED type.

9. The system according to claim 1, wherein the interface disposition includes at least one of:

an actuation interface spatially associated with the placement disposition, such that an exterior contact surface is coplanar with an exterior surface of at least one of: the placement disposition and a casing of the apparatus, and does not include components disposed so as to intersect an alignment of the reference axis (X) or disposed in the vicinity thereof.

10. The system according to claim 1, wherein the interface disposition includes apprehension means operatively associated with the placement disposition along an actuation alignment that extends around the reference axis (X) configured to receive the direct contact, the direct contact being a touch gesture around the recipient, and said apprehension means are configured to receive at least one aspect of rotation movement of the touch gesture around the recipient, including at least one of:

a type of movement, including at least one rotation movement of the actuation interface with relation to the reference axis (X), a direction of movement, including at least of rotation in the clockwise direction and in a direction opposite to clockwise, a relative inclination of a top surface of the actuation interface, different types of touch in the top surface of the actuation interface, including by sliding, by spot touch, or by touch applying downward pressure.

11. The system according to claim 1, wherein the interface disposition includes apprehension means configured to apprehend aspects of rotation movement of the actuation interface-around the reference axis (X), from a first position (I) to at least a second position (II), by means of at least one of:

electro mechanic means;

optical means.

12. The system according to claim 1, wherein the interface disposition is provided in operative connection with said control means so as to provide input to at least one of:

a selection of the type of discharge of substance to the recipient;

an actuation of start of the cycle of preparation of edible product;

a selection of the quantity of edible product to be discharged through the placement disposition;

a start and a finish of discharge of edible product through the placement disposition, an actuation at least of an opening movement and a closing movement of supply passageway of portion of an edible substance, and product preparation device operatively associated therewith, and display of information of a state to the user associated with at least one of said interactions of selection, whereby said apprehension means are configured to only operate based on the recipient being in a retention position (B) on the placement support of the placement disposition.

13. The system according to claim 1, wherein the interface disposition is provided in functional connection with said control means and configured to provide selection of the type and/or characteristics of the edible product and/or of the discharge thereof, according to at least one of:

a type of movement, including vertical translation or rotation with relation to the reference axis (X) of the placement disposition; and a direction of the movement, including vertically downwards or upwards and rotation in the clockwise direction or opposite thereto, and the interface disposition is configured to provides input for regulation of the quantity of edible product to be discharged, according to at least one of:

an extension of movement of engagement of the recipient on the placement disposition, including at least a first position (I) in retention condition (B; C);

a period of time in which the recipient is operatively engaged on the placement disposition, at least in an extension of engagement movement that corresponds to the first position (I) or to a second position (II) in retention condition (B; C).

14. The system according to claim 1, wherein the apparatus includes output means spatially associated with the placement disposition and operatively to the interface disposition, said output means being configured to display to the user an indication associated with a manual interaction with the interface disposition, and said output means can be provided as at least one of:

associated with an actuation surface of the actuation interface, associated with a surface of the placement disposition.

15. A process for operating a system of distribution of edible products, the process including manual interaction by a user with an interface disposition of an apparatus so as to regulate a cycle of operation thereof, wherein said manual interaction includes a direct touch by the user on an actuation surface of an actuation interface that extends around a reference axis (X) associated with a discharge of edible product, said direct touch being carried out before a start of an operation cycle, and the realization of the operation cycle not requiring the actuation by the user of another utilization interface of the apparatus.

16. The process according to claim 15, wherein the manual interaction is carried out by means of at least the direct touch on the actuation interface around a placement support provided for placement of the recipient of collection of edible product, and said manual interaction is characterized by the control means so as to be associated with a selection of at least one of: start, stop, duration and quantity of discharge of edible product.

17. The system according to claim 10, wherein said apprehension means receives the touch gesture only when the recipient is placed in the recipient placement disposition.

18. The system according to claim 9, wherein the interface disposition does not include components inside a vertical projection of the placement support.

19. The system according to claim 14, wherein the indication is in a form of a plurality of light spots.

* * * * *